M. D. REIP.
SHOCK COLLECTING APPARATUS.
APPLICATION FILED MAY 2, 1913.
1,085,161.
Patented Jan. 27, 1914.
2 SHEETS—SHEET 1.
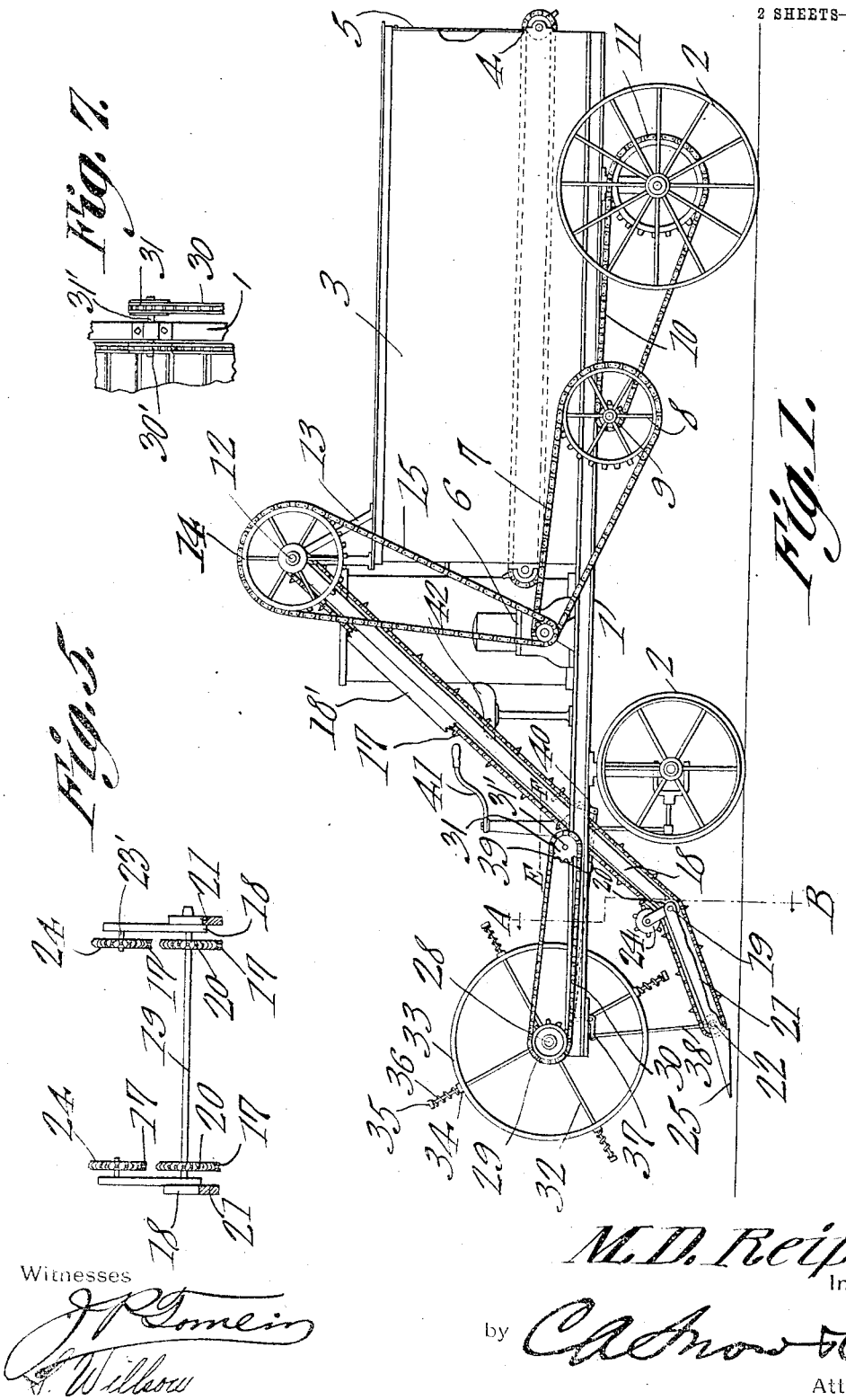
Witnesses
M. D. Reip,
Inventor
by
Attorneys

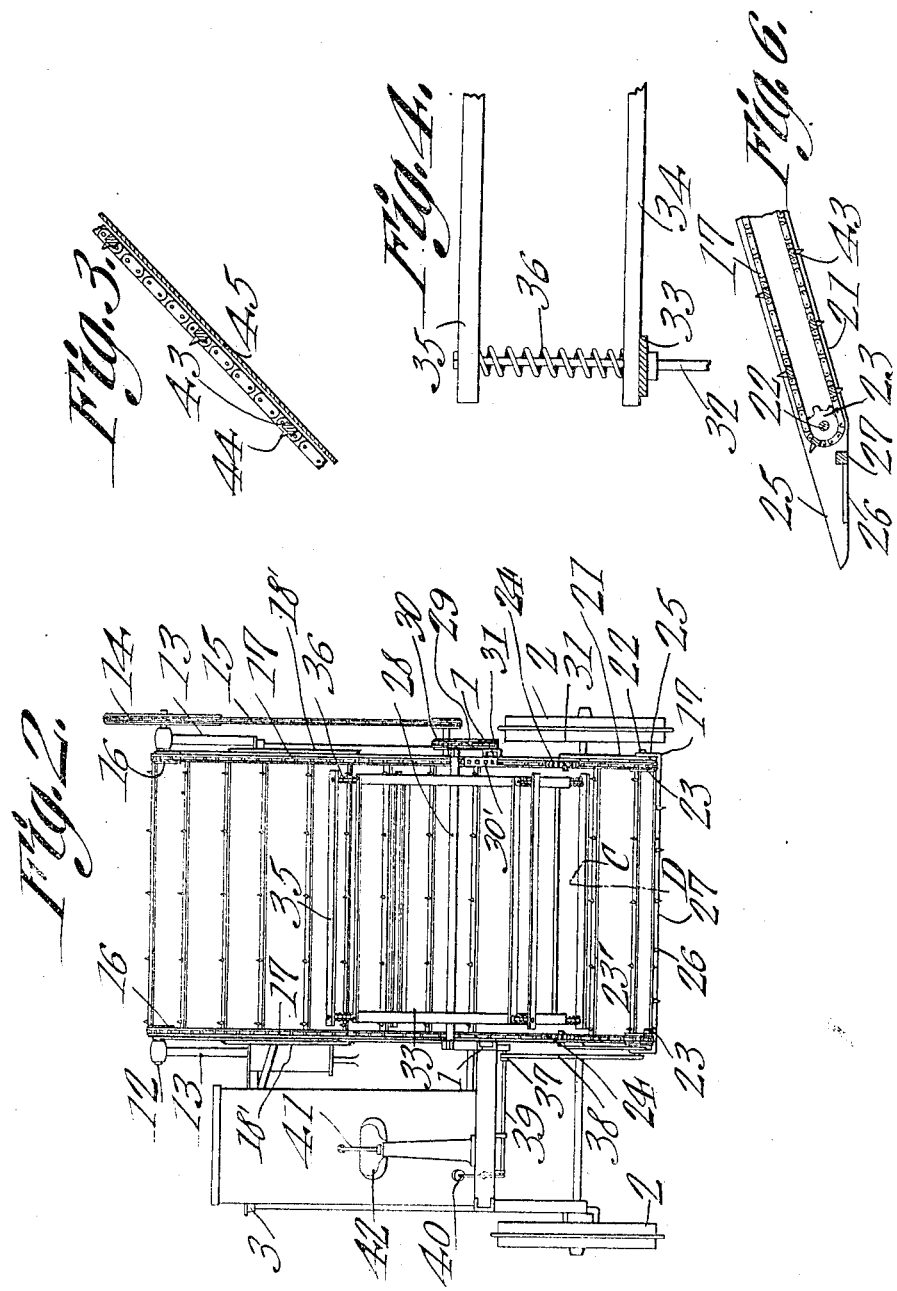

UNITED STATES PATENT OFFICE.

MORGAN D. REIP, OF LOTHAIR, MONTANA.

SHOCK-COLLECTING APPARATUS.

1,085,161.  Specification of Letters Patent.  Patented Jan. 27, 1914.

Application filed May 2, 1913. Serial No. 765,152.

*To all whom it may concern:*

Be it known that I, MORGAN D. REIP, a citizen of the United States, residing at Lothair, in the county of Hill and State of Montana, have invented a new and useful Shock-Collecting Apparatus, of which the following is a specification.

This invention relates to apparatus for collecting shocks or bundles, one of its objects being to provide a vehicle adapted to be propelled in any suitable manner and which has means whereby the standing shocks or bundles are directed rearwardly onto an elevator which carries them upwardly and discharges them into a suitable receptacle provided therefor.

A further object is to provide novel means for directing the shocks or bundles onto the elevator.

A further object is to provide simple means whereby the front end of the shock collecting mechanism can be raised or lowered at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of the machine. Fig. 2 is a front elevation thereof. Fig. 3 is an enlarged longitudinal section through a portion of the elevator. Fig. 4 is an enlarged detail view of a portion of the reel. Fig. 5 is a section on line A—B Fig. 1. Fig. 6 is a section on line C—D Fig. 2. Fig. 7 is a section on line E—F Fig. 1.

Referring to the figures by characters of reference 1 designates the frame of the vehicle, the same being provided with suitable supporting wheels 2. A body or receptacle 3 is mounted on the rear portion of the frame and the bottom thereof is preferably formed by an endless apron 4 which can be driven in any suitable manner whenever desired. Thus it will be seen that when the receptacle is filled, it is merely necessary to actuate the endless apron so that the contents of the body will be conveyed rearwardly and thus discharged from the rear end of the body. The body may be provided with a suitable end gate 5 which can be opened in any desired manner so as to permit the discharge of the bundles supported by the apron.

In the structure shown, the vehicle is adapted to be driven by a motor, said motor being indicated at 6 and being adapted to transmit motion, through a chain 7 to a sprocket 8 which rotates with a smaller sprocket 9. This last named sprocket drives a chain 10 which, in turn, engages a large sprocket 11 connected to the rear axle of the vehicle or to one of the rear supporting wheels.

A transverse shaft 12 is journaled upon suitable brackets 13 mounted on the front end portion of the body 3 and this shaft is provided with a sprocket 14 which receives motion, through a chain 15 or the like, from the motor 6. Shaft 12 is provided with spaced sprockets 16 on which are mounted endless chains 17, these chains extending downwardly inside of an inclined frame 18 which is suitably secured to the frame 1. A transverse shaft 19 is mounted in the lower end portion of the frame 18 and carries sprockets 20 which are engaged by the endless chains 17. A supplemental frame 21 is mounted to swing upon the shaft 19 and a transverse shaft 22 is mounted in the free end of the supplemental frame and has sprockets 23 engaged by the endless chains 17. Studs 23' are arranged above shaft 19 and support idler sprockets 24 which engage the chains 17 directly above sprockets 20. The front ends of the sides of supplemental frame 21 are extended forwardly to form runners 25 and interposed between these runners is a series of gathering teeth 26, said teeth being extended from a cross strip 27 which connects the runners 25 at points close to the chains 17.

The frame 1 extends in front of the frame 18 so as to overhang the supplemental frame 21 and journaled upon the forward portion of the frame 1 is a transverse shaft 28 having a sprocket 29 adapted to receive motion, through a chain 30, from a sprocket 31 secured to a shaft 31' journaled on one side of frame 1. This shaft has a sprocket 30' which engages and is driven by one of the chains 17. Shaft 28 has spokes 32 radiating therefrom and connected to rims 33 of a reel. These rims are connected by cross slats 34.

The spokes 32 extend radially beyond the rims and slidably mounted on the projecting ends of these spokes are cross heads 35, there being springs 36 interposed between these cross heads and the strips 34, said springs being mounted on the projecting ends of the spokes, as shown particularly in Figs. 1 and 4.

A bell crank lever 37 is mounted on the front end portion of the frame 1 and a lifting rod 38 extends downwardly therefrom to the front end portion of the supplemental frame 21. An actuating rod 39 extends rearwardly from the bell crank lever to a foot lever 40 adapted to be actuated by the operator so that, when the foot lever is pushed forwardly at its upper end, the bell crank lever will be shifted so as to pull upwardly on the rod 38 and thus swing the supplemental frame upon the shaft 19. Thus the distance between the runners 25 and the surface of the ground can be varied at will.

In the structure shown in Fig. 1, a steering lever has been indicated at 41, it being understood that this lever is adapted to operate any suitable means whereby the machine may be properly guided. The seat for the operator has been indicated at 42. The endless chains 17 are connected by cross slats 43 preferably provided with outstanding teeth 44 and a strip 45 of canvas or the like is preferably stretched across the frame 18 under the upper flights of the chains so as to prevent material from falling through the frame. When the machine is driven forward, the teeth or fingers 26 will come against the bottoms of the standing shocks or bundles and the rotating reel will strike said shocks or bundles and throw them rearwardly onto the endless conveyer or elevator made up of the chains 17 and the cross slats 43. Thus the shocks will be carried upwardly and will be discharged into the body 3 and onto the endless apron 4. By manipulating the foot lever 40, the front end of the supplemental frame 21 can be raised or lowered. By providing spring pressed cross heads 35, said heads are permitted to yield should they strike exceptionally large bundles and danger of the reel becoming clogged and its movement interfered with is thus eliminated.

It is to be understood that the drive mechanism can be provided with any suitable clutch for placing it in and out of gear and, furthermore, any desired mechanism can be employed whereby the machine can be driven either forwardly or backwardly.

If desired, guards may be extended upwardly from the sides of frame 18, as indicated at 18' in Fig. 1 where a portion of one of these guards has been illustrated. These guards will prevent bundles from falling laterally off of the elevator.

What is claimed is:—

1. A machine for collecting shocks and the like including a structure having a receptacle, an endless elevator discharging into the receptacle, a supplemental frame, said endless elevator extending along said frame, means for swinging said supplemental frame upwardly and downwardly to adjust the lower portion of the endless elevator angularly relative to the remaining portion thereof, and gathering fingers extending forwardly from the supplemental frame.

2. A machine for collecting shocks and the like including a structure having a receptacle, an endless elevator discharging into the receptacle, a supplemental frame mounted to swing upwardly and downwardly, said endless elevator extending along said frame, gathering fingers extending forwardly from the supplemental frame, means for raising and lowering the forward end of the supplemental frame relative to the wheel supported structure, and a reel mounted for rotation above the supplemental frame for directing bundles rearwardly onto the elevator, said reel including spring pressed cross heads adapted to yield inwardly toward the center of the wheel when brought into contact with unyielding obstructions.

3. A machine for gathering shocks and the like including a wheel supported structure, a receptacle, a reel mounted for rotation, spring pressed cross heads carried by the reel and adapted to shift inwardly toward the axis of the reel when contacting with an unyielding obstruction, gathering fingers, and means for elevating shocks from the gathering fingers to the receptacle, said reel constituting means for directing the shocks onto the elevating means.

In testimony that I claim the foregoing as my own, I have hereto affixed my signature in the presence of two witnesses.

MORGAN D. REIP.

Witnesses:
E. W. DENISON,
JOHN JACOBSON.